(12) United States Patent
Narita

(10) Patent No.: US 10,343,204 B2
(45) Date of Patent: Jul. 9, 2019

(54) PRESS MOLDING AND MANUFACTURING METHOD THEREFOR

(71) Applicant: Yorozu Corporation, Kanagawa (JP)

(72) Inventor: Akira Narita, Kanagawa (JP)

(73) Assignee: YOROZU CORPORATION, Kanagawa (JP)

( * ) Notice: Subject to any disclaimer, the term of this patent is extended or adjusted under 35 U.S.C. 154(b) by 642 days.

(21) Appl. No.: 14/783,978

(22) PCT Filed: Apr. 11, 2013

(86) PCT No.: PCT/JP2013/060919
§ 371 (c)(1),
(2) Date: Jan. 5, 2016

(87) PCT Pub. No.: WO2014/167687
PCT Pub. Date: Oct. 16, 2014

(65) Prior Publication Data
US 2016/0136713 A1    May 19, 2016

(51) Int. Cl.
*B21D 39/03* (2006.01)
*B21D 28/26* (2006.01)
(Continued)

(52) U.S. Cl.
CPC ............... *B21D 28/26* (2013.01); *B21D 5/01* (2013.01); *B21D 19/088* (2013.01);
(Continued)

(58) Field of Classification Search
CPC .................................................. B21D 39/032
See application file for complete search history.

(56) References Cited

U.S. PATENT DOCUMENTS 2,123,625 A * 7/1938 Emmer ................... B42B 5/10
                                                      281/27.2
3,160,131 A * 12/1964 Wilhelm ................. E04C 2/365
                                                       29/512
4,306,511 A * 12/1981 Ashby ................... B21D 39/034
                                                       29/432

FOREIGN PATENT DOCUMENTS

JP      2001-096325 A      4/2001
JP      2004-359137 A     12/2004
JP       2010247757 A     11/2010

OTHER PUBLICATIONS

English Translation of JP2010247757 from EPO dated Mar. 17, 2018 (Year: 2018).*

(Continued)

*Primary Examiner* — Adam Krupicka
(74) *Attorney, Agent, or Firm* — Nixon Peabody LLP; Thomas Pavelko

(57) ABSTRACT

[Object] Provided are a press-molded product in which the plank pieces can be appropriately matched with each other and the weight of the product is not increased even when the plank pieces can be appropriately matched with each other, and a method of manufacturing the same.
[Solving Means] The present invention is a press-molded product (100) formed by bending a blank (B) to divide the blank into a first plank piece (10) and a second plank piece (20) with a bending portion interposed therebetween and making the first plank piece and the second plank piece come into contact with each other through the bending. The first plank piece and the second plank piece include punching portions (11, 21) formed by punching the blank, and a first rising portion (12) and a second rising portion (22) formed by raising the rims of the punching portions. There is provided a positioning portion (40) that positions the first plank piece and the second plank piece by engaging the first (Continued)

rising portion of the first plank piece with the second rising portion of the second plank piece.

5 Claims, 10 Drawing Sheets

(51) Int. Cl.
*B21D 5/01* (2006.01)
*B60G 7/00* (2006.01)
*B21D 19/08* (2006.01)
*B21D 53/90* (2006.01)

(52) U.S. Cl.
CPC ........... *B21D 39/032* (2013.01); *B60G 7/001* (2013.01); *B21D 53/90* (2013.01); *B60G 2206/122* (2013.01); *B60G 2206/8102* (2013.01)

(56) References Cited

OTHER PUBLICATIONS

Office Action for Korean Application No. 10-2015-7031892, dated Jul. 3, 2017.
International Search Report dated Jun. 17, 2013 in International Application No. PCT/JP2013/060919 (2 pages).

* cited by examiner

PRESS MOLDING AND MANUFACTURING METHOD THEREFOR

CROSS REFERENCE TO RELATED APPLICATIONS

This application is a national stage application (under 35 U.S.C. § 371) of PCT/JP2013/060919, filed Apr. 11, 2013, the contents of which is hereby incorporated by reference in its entirety.

TECHNICAL FIELD

The present invention relates to a press-molded product and a method of manufacturing the same.

BACKGROUND ART

Pressing configures one piece of plate in a predetermined shape by performing bending forming or drawing unlike casting which makes a material obtained by liquefying metal, and the like flow through a mold to form a desired shape. For this reason, for example, according to a technology, when a product having a hollow shape is formed in pressing, a pair of shapes, each of which has substantially a half of the hollow shape corresponding to the product, is formed on a blank. Herein, a portion corresponding to the half of the hollow shape which corresponds to the product is referred to as a plank piece. Then, the pair of shapes of plank pieces formed on the blank is bent so as to be fitted together into one hollow body, and the pair of the shapes of the plank pieces is matched with each other (see Patent Literature 1).

CITATION LIST

Patent Literature

Patent Literature 1: JP 2010-247757 A

SUMMARY OF INVENTION

Technical Problem

When a product having the above-mentioned hollow shape is formed using pressing, a pair of shapes of plank pieces needs to be matched with each other when the shapes are bent. However, in some cases, there is difficulty in matching the shapes of the plank pieces with each other due to variation, and the like. However, when a shape of a flange part, and the like which matches the plank pieces with each other is largely formed such that the plank pieces can be matched with each other even when the shapes of the plank pieces vary, there is a problem in that a weight of a component excessively increases and may not be set to an appropriate value.

In this regard, the present invention has been conceived to solve the above-mentioned problem, and an object of the present invention is to provide a press-molded product and a method of manufacturing the same which may appropriately match plank pieces with each other and does not cause the product to increase in weight even when the plank pieces can be appropriately matched with each other.

Means for Solving Problem

In order to solve the above-mentioned object, the present invention includes a press-molded product formed by bending a blank to divide the blank into a first plank piece and a second plank piece with a bending portion interposed therebetween, and making the first plank piece and the second plank piece come into contact with each other through bending. Each of the first plank piece and the second plank piece of the press-molded product has a punching portion formed by being stamped from the blank and a rising portion formed by rising a rim of the punching portion. In the present invention, a positioning portion is provided to position the first plank piece and the second plank piece by engaging the rising portion of the first plank piece with the rising portion of the second plank piece.

In addition, a method of manufacturing a press-molded product according to the present invention is a method of manufacturing a press-molded product formed by bending a blank to divide the blank into a first plank piece and a second plank piece with a bending portion interposed therebetween, and making the first plank piece and the second plank piece come into contact with each other through bending. The manufacturing method according to the present invention includes stamping parts corresponding to the first plank piece and the second plank piece to form punching portions by performing punching when the blank is bent and divided, forming a first rising portion in the first plank piece and forming a second rising portion in the second plank piece by performing pressing to raise rims of the punching portions, and bending the blank such that the first plank piece and the second plank piece formed by the bending come into contact with each other.

According to the present invention, in the bending, there is provided a positioning portion that positions the first plank piece and the second plank piece by engaging the first rising portion with the second rising portion.

Advantageous Effect of the Invention

In a press-molded product and a method of manufacturing the same according to the invention, a positioning portion is provided to engage a first rising portion of a first plank piece with a second rising portion of a second plank piece, thereby positioning the first plank piece and the second plank piece. For this reason, it is possible to appropriately match the plank pieces with each other by making the plank pieces come into contact with each other using the positioning portion. In addition, the positioning portion is premised on the assumption that a punching portion is provided in a blank, and thus it is possible to prevent the press-molded product from increasing in weight while appropriately matching the plank pieces with each other using the positioning portion.

DESCRIPTION OF EMBODIMENTS

Hereinafter, embodiments of the present invention will be described with reference to accompanying drawings. Description below does not restrict a technical scope and meanings of terms described in claims. In addition, a dimension ratio of the drawings may be exaggerated and different from an actual ratio for convenience of description.

Figure 1:
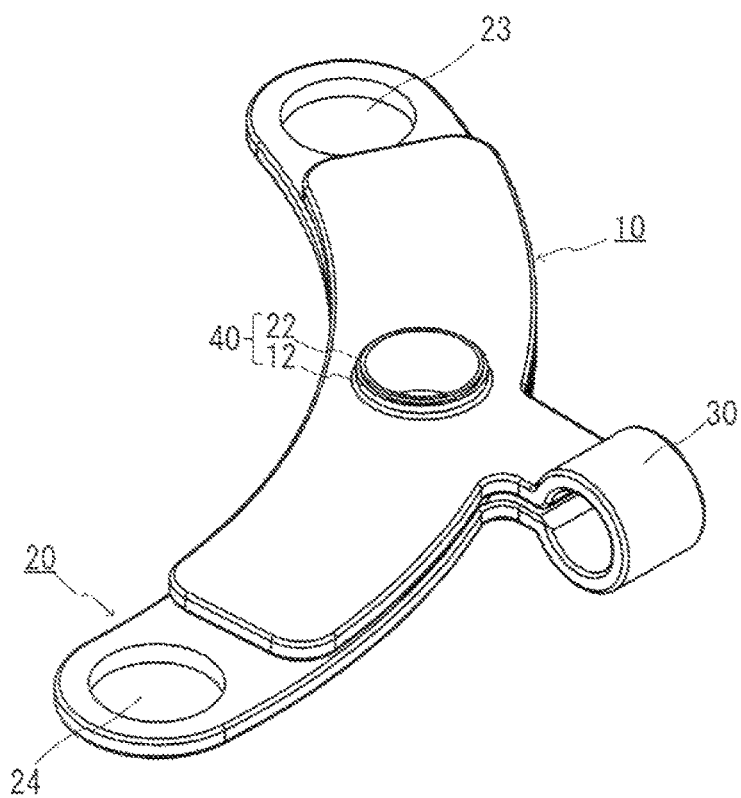
FIG. 1 is a perspective view illustrating a press-molded product according to an embodiment of the present invention.
Figure 2:
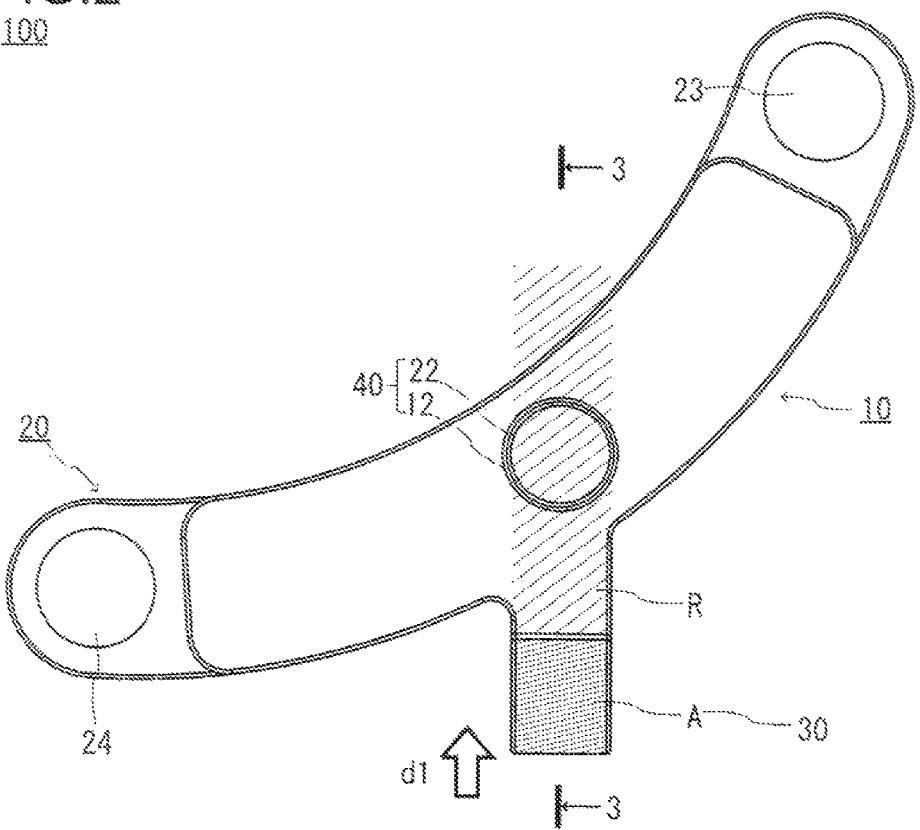
FIG. 2 is a plan view illustrating the press-molded product.
Figure 3:
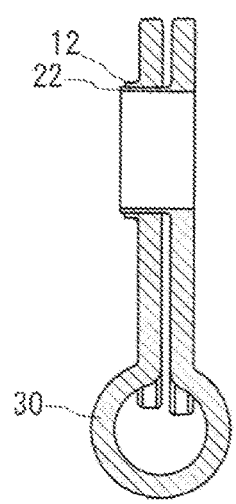
FIG. 3 is a cross-sectional view taken along line 3-3 of FIG. 2.
Figure 4:
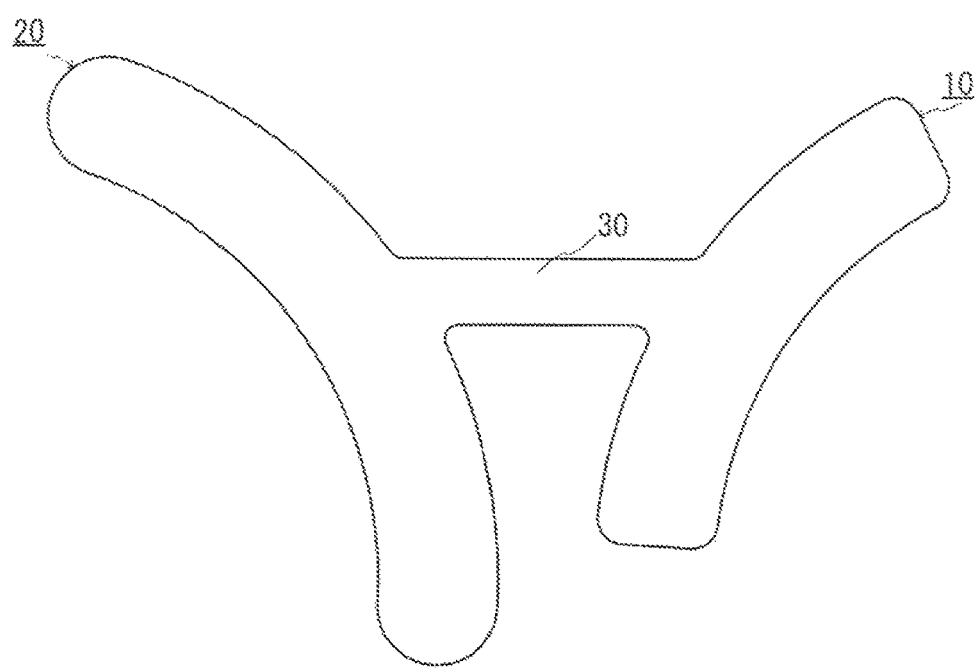
FIG. 4 is a diagram illustrating a state in which a predetermined shape is stamped from a blank when the press-molded product is formed.
Figure 5:
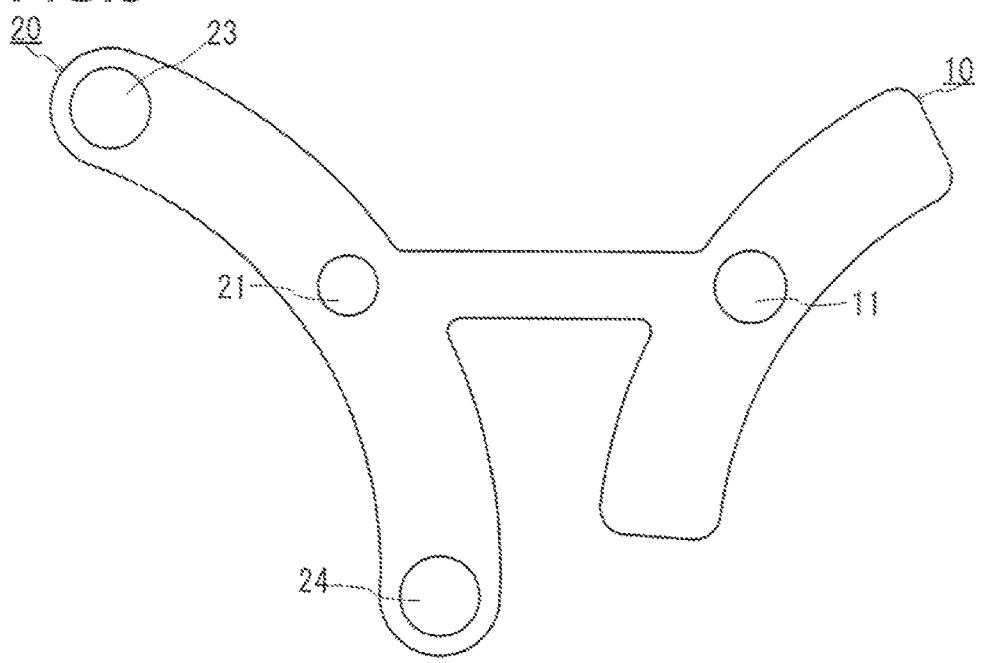
FIG. 5 is a diagram illustrating a state in which mounting holes and parts corresponding to punching portions of the product are stamped when the press-molded product is formed.
Figure 6:
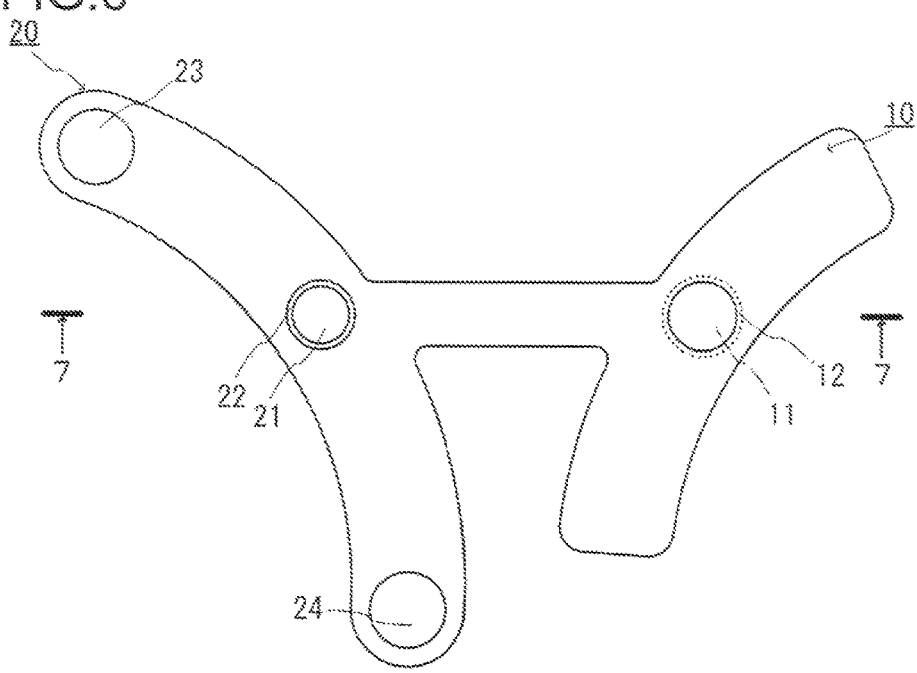
FIG. 6 is a plan view illustrating that rising portions are formed when the press-molded product is formed.
Figure 7:
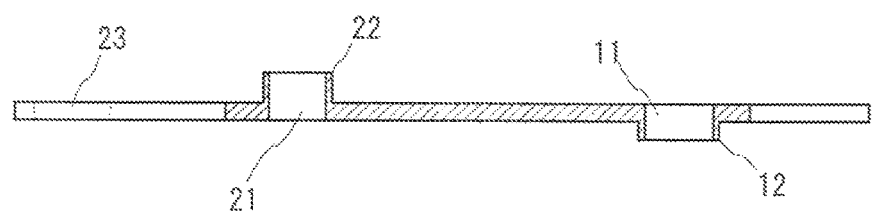
FIG. 7 is a cross-sectional view taken along line 7-7 of FIG. 6.

FIG. 1 is a perspective view illustrating a press-molded product according to an embodiment of the present invention, FIG. 2 is a plan view illustrating the press-molded product, and FIG. 3 is a cross-sectional view taken along line 3-3 of FIG. 2. FIG. 4 is a plan view illustrating a state in which a predetermined shape is stamped from a blank when the press-molded product is formed, FIG. 5 is a plan view illustrating a state in which mounting holes and parts corresponding to punching portions of the product are stamped when the press-molded product is formed, FIG. 6 is a plan view illustrating that rising portions are formed when the press-molded product is formed, and FIG. 7 is a cross-sectional view taken along line 7-7 of FIG. 6.

Brief description will be given with reference to FIGS. 1 to 7. A press-molded product 100 according to the present embodiment is formed by bending a pair of blanks B to divide the blanks B into a first plank piece 10 and a second plank piece 20 through a bending portion 30, and making the first plank piece 10 and the second plank piece 20 come into contact with each other while forming the bending portion 30 of the blanks B in a hollow shape such as a cylinder.

The first plank piece 10 and the second plank piece 20 include punching portions 11 and 21 formed by stamping arbitrary portions of the respective blanks B, and a first rising portion 12 and a second rising portion 22 formed by raising rims of the punching portions 11 and 21. According to the present embodiment, the press-molded product 100 includes a positioning portion 40 that positions the first plank piece 10 and the second plank piece 20 by engaging the first rising portion 12 of the first plank piece 10 with the second rising portion 22 of the second plank piece 20. In addition, the press-molded product 100 includes mounting holes 23 and 24 for a connection with another component.

For example, the press-molded product 100 is used for a suspension link which is a component of a suspension of a vehicle, and the like. However, the present invention is not limited thereto. Hereinafter, description will be given in detail.

The first plank piece 10 and the second plank piece 20 are connected to each other through the bending portion 30 of the blanks B, and substantially correspond to halves of a shape of the press-molded product 100. When the mounting holes 23 and 24 for the connection with the other component are not provided in the first plank piece 10 unlike the second plank piece 20, it is possible to reduce a weight of the press-molded product 100. However, shapes of the mounting holes 23 and 24 may be provided in the first plank piece 10 similarly to the second plank piece 20.

The punching portions 11 and 21 are through holes which are stamped in predetermined shapes and provided in substantially centers of the first plank piece 10 and the second plank piece 20. When the punching portions 11 and 21 are provided, it is possible to reduce the weight of the press-molded product 100. The punching portions 11 and 21 are configured in shapes of circles. However, other shapes such as polygons, and the like may be formed when there is no difficulty in forming the shapes.

The first rising portion 12 and the second rising portion 22 are formed by raising the rims of the punching portions 11 and 21 of the first plank piece 10 and the second plank piece 20 substantially at right angles such that the rims are raised in the same direction when the rims are bent. External shapes of the first rising portion 12 and the second rising portion 22 are circular shapes in plan view, and the first rising portion 12 is larger than the second rising portion 22. In the present embodiment, the first rising portion 12 is fit into the second rising portion 22. In this way, the positioning portion 40 is formed. The positioning portion 40 positions the first plank piece 10 and the second plank piece 20 by fitting the first rising portion 12 to the second rising portion 22.

Figure 13:
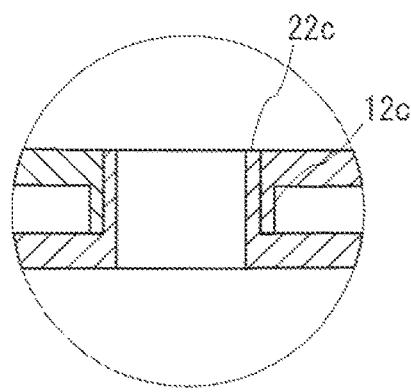
FIG. 13 is a cross-sectional view illustrating a modified example of the first rising portion of the press-molded product.

The positioning portion 40 positions the first plank piece 10 and the second plank piece 20 by engaging the first rising portion 12 with the second rising portion 22, for example, using fitting as described above. However, a positioning scheme is not restricted to fitting. FIG. 13 is a diagram illustrating a modified example of positioning of the first rising portion and the second rising portion in the press-molded product of the present embodiment. There may be a case in which the first rising portion 12 and the second rising portion 22 included in the positioning portion 40 cannot be formed in desired positions due to variation.

Figure 10A:
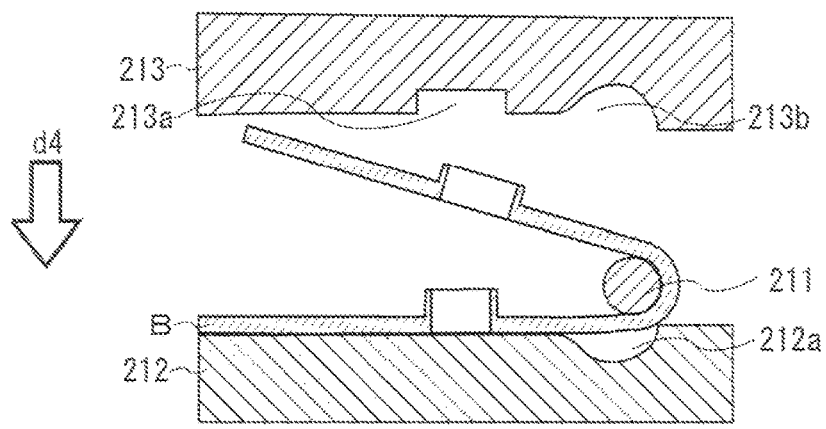
FIGS. 10(A) and 10(B) are cross-sectional views illustrating a bending process when the press-molded product is formed.
Figure 10B:
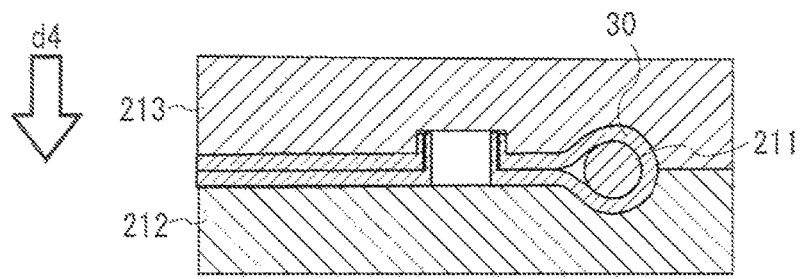
Figure 11A:
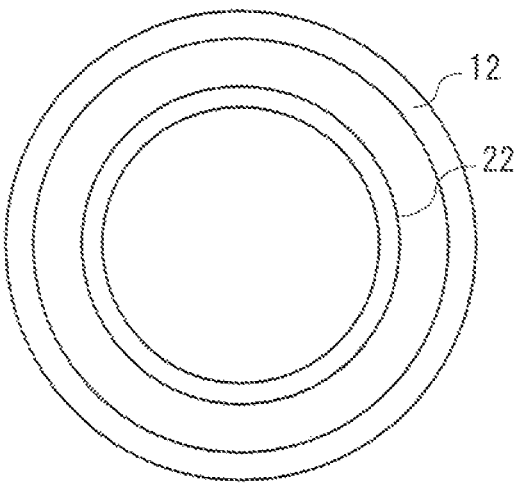
FIGS. 11(A) and 11(B) are diagrams for description of a modified example of positioning a first rising portion and a second rising portion when the press-molded product is formed.
Figure 11B:
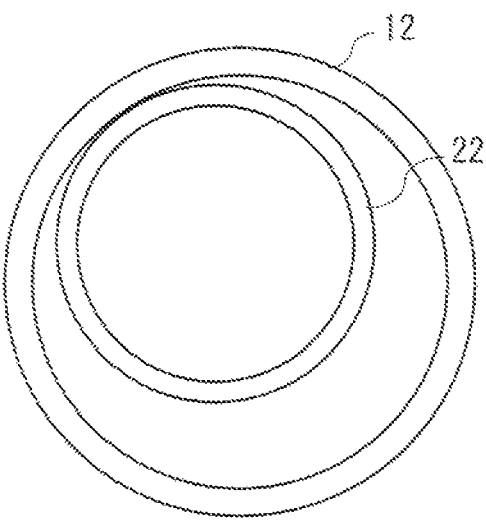

For this reason, the second rising portion 22 is formed to have play with respect to the first rising portion 12 as illustrated in FIG. 11, and inserted into the first rising portion 12 as illustrated in FIG. 10(A). Then, the first plank piece 10 and the second plank piece 20 may be connected and joined to each other using a scheme such as welding, adhesive bonding, hemming, caulking, and the like after the second rising portion 22 is positioned with respect to the first rising portion 12 such that the first plank piece 10 and the second plank piece 20 are positioned. In this way, when the first rising portion 12 and the second rising portion 22 are joined to each other using hemming or caulking while allowing sizes of the first rising portion 12 and the second rising portion 22 to have play, it is possible to sufficiently fix the first plank piece 10 and the second plank piece 20 even when a position of the first rising portion 12 or the second rising portion 22 varies.

Figure 12A:
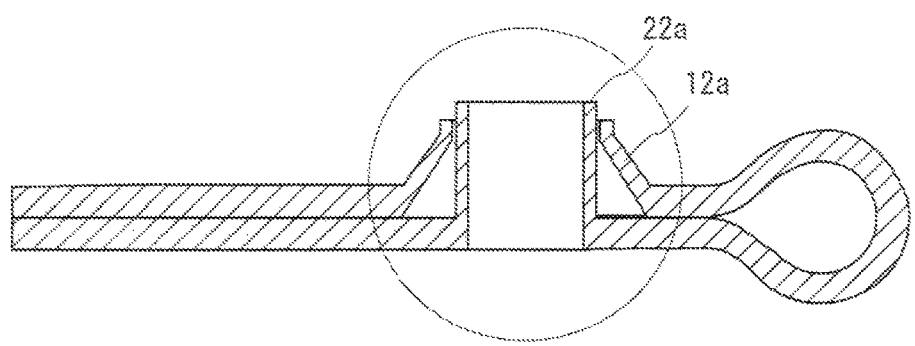
FIG. 12(A) is a cross-sectional view illustrating a modified example of the first rising portion of the press-molded product.
Figure 12B:
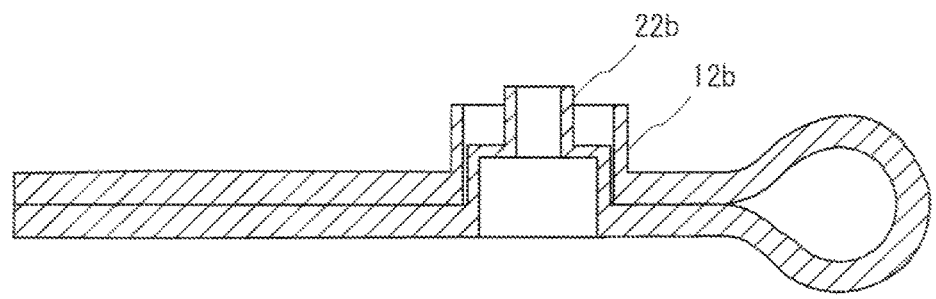
FIG. 12(B) is a cross-sectional view illustrating a modified example of the second rising portion of the press-molded product.

FIGS. 12(A) and 12(B) are cross-sectional views illustrating a modified example of the first rising portion of the press-molded product. The first rising portion 12 has been described to be formed by being raised substantially at a right angle. However, the present invention is not limited thereto. A first rising portion 12a may be formed in a shape for guiding a second rising portion 22a inserted thereto. For example, the first rising portion 12a may be formed in a tapered shape as illustrated in FIG. 12(A). In this way, the second rising portion 22a is easily inserted into the first rising portion 12a, and it is possible to improve productivity. In addition, separately from FIG. 12(A), when a second rising portion 22b inserted into a first rising portion 12b is formed in a stepped shape corresponding to a shape of a step as illustrated in FIG. 12(B), the second rising portion 22b is easily inserted into the first rising portion 12b, and it is possible to improve productivity.

The mounting holes 23 and 24 have shapes for connecting the press-molded product 100 with another component (for example, a subframe of a suspension, a knuckle of a tire, and the like). In the present embodiment, mounting holes correspond to the mounting holes 23 and 24. However, the number of mounting holes is not limited thereto.

The bending portion 30 is a bending portion used when the press-molded product 100 is formed. In the present embodiment, the bending portion 30 is formed in a shape of a hollow cylinder without being crushed as described below. In this way, the bending portion 30 may be used as amounting hole of another component (for example, the subframe of the suspension) similarly to the mounting holes 23 and 24.

In addition, referring to the bending portion 30, the positioning portion 40 preferably overlaps at least a portion of a range R formed by extending a bent region A, which is formed by the bending portion 30, along a bending direction d1 of the blanks B when the press-molded product 100 is seen in plan view as in FIG. 2. In this way, when the positioning portion 40 is provided, the hollow shape of the bending portion 30 is rarely distorted even when positions of the first rising portion 12 and the second rising portion 22 vary at the time of positioning the first plank piece 10 and the second plank piece 20. Moreover, it is possible to make an out-of-roundness of the hollow shape of the bending portion 30 accurate. As a result, another component may be favorably mounted on the bending portion 30.

Figure 8A:
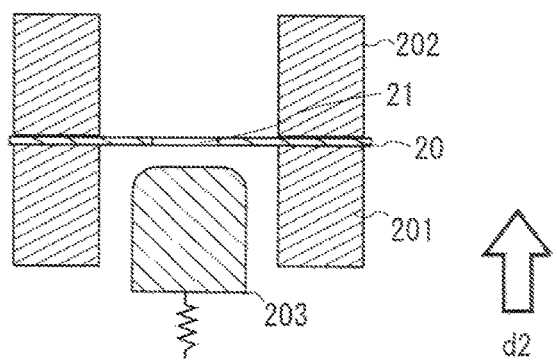
FIGS. 8(A) and 8(B) are cross-sectional views illustrating a process of forming the rising portions when the press-molded product according to the present embodiment is formed.
Figure 8B:
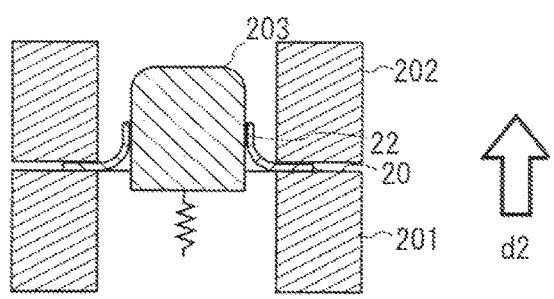

Next, a description will be given of a method of manufacturing the press-molded product of the present embodiment. FIGS. 8(A) and 8(B) are cross-sectional views illustrating a process of forming rising portions when the press-molded product according to the present embodiment is formed, and FIGS. 9(A) and 9(B) and FIGS. 10(A) and 10(B) are cross-sectional views illustrating a bending process when the press-molded product according to the present embodiment is formed. The cross-sectional views of FIGS. 9(A) and 9(B) and FIGS. 10(A) and 10(B) correspond to the same position as FIG. 7. In addition, the manufacturing method to be described below is an example, and the present invention is not limited thereto.

The method of manufacturing the press-molded product 100 according to the present embodiment largely includes a stamping process, the rising portion formation process, and the bending process. The respective processes will be described below in detail.

First, an external shape as illustrated in FIGS. 4 and 5 is stamped from a blank such as a rolled steel plate in the stamping process such that the mounting holes 23 and 24 and the punching portions 11 and 21 are formed. The stamping process belongs to a well-known method, and thus a detailed description thereof will be omitted.

Next, the rising portion formation process will be described. First, as illustrated in FIGS. 8(A), portions close to the rims of the punching portions 11 and 21 of the blanks B are sandwiched by press dies 201 and 202. Then, a punch 203 is put close to the punching portions 11 and 21 of the blanks B, and the rims of the punching portions 11 and 21 are raised as illustrated in FIG. 8(B) through a so-called burring process (see an arrow d2 of FIGS. 8(A) and 8(B)). In this way, the first rising portion 12 is formed in the punching portion 11, and the second rising portion 22 is formed in the punching portion 21. FIGS. 8(A) and 8(B) illustrate the punching portion 21. However, the punching portion 11 is merely different from the punching portion 21 in direction, and thus is not illustrated.

Figure 9A:
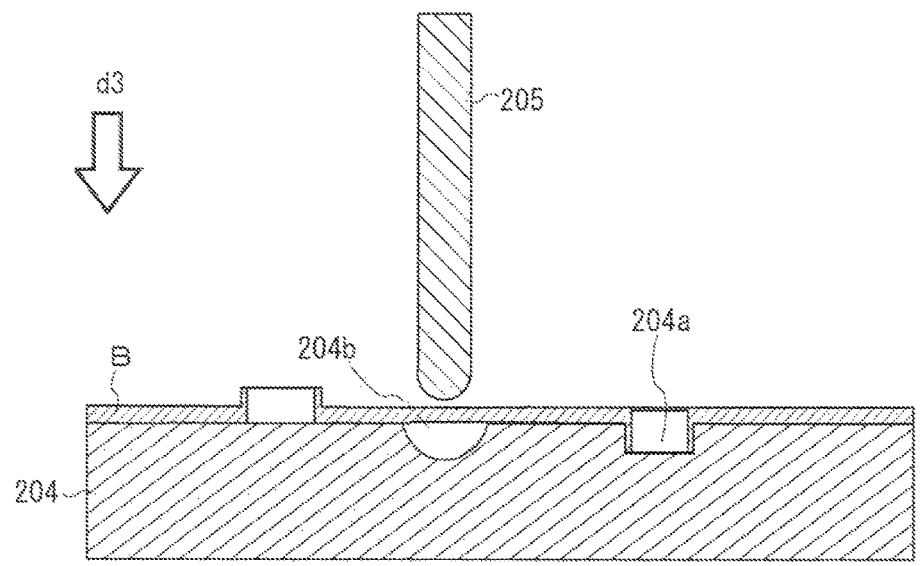
FIGS. 9(A) and 9(B) are cross-sectional views illustrating a bending process when the press-molded product is formed.
Figure 9B:
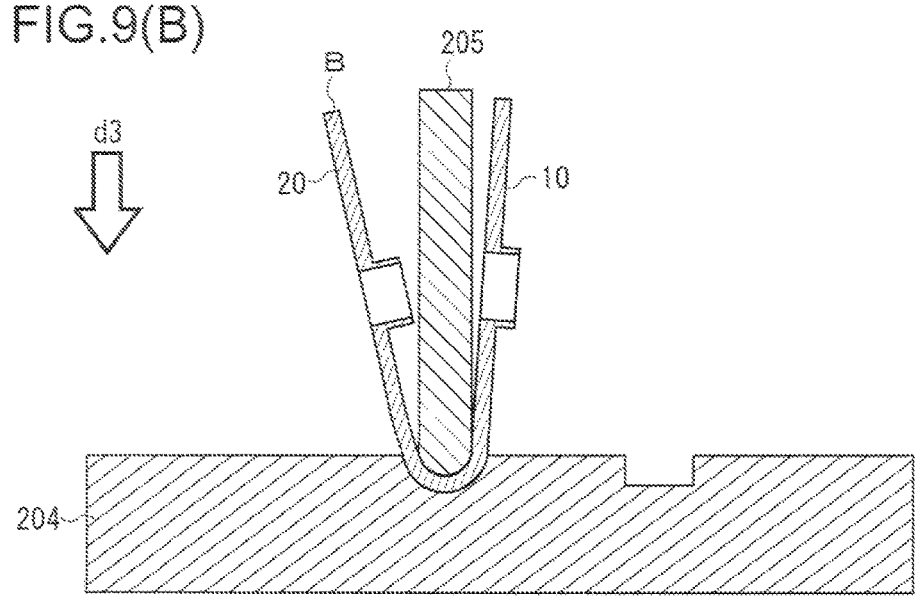

In the bending process, as illustrated in FIG. 9(A), first, the blanks B are placed on a fixed die 204 which is provided with a depression 204a corresponding to the second rising portion 22 and a depression 204b corresponding to the bending portion 30. Then, press molding is performed by putting a movable die 205, which has a distal end formed in a shape of a half of a cylinder, close to the depression 204b of the fixed die 204 such that a part corresponding to the bending portion 30 is formed inside the depression 204b (see an arrow d3 of FIGS. 9(A) and 9(B)). In this way, as illustrated in FIG. 9(B), the blanks B are bent using the bending portion 30 as a starting point, and the first plank piece 10 and the second plank piece 20 are raised and formed to approach sides of the movable die 205.

Next, as illustrated in FIG. 10(A), a core 211 is disposed inside the bending portion 30 of the blanks B. Next, the blanks B are placed on the fixed die 212, which has a depression 212a corresponding to the bending portion 30, and fixed thereto. Then, a movable die 213, which has a depression 213a corresponding to the first rising portion 12 and a depression 213b corresponding to the bending portion 30, is moved toward and put close to the fixed die 212, and press molding is performed on the blanks B (see an arrow d4 of FIGS. 10(A) and 10(B)).

When the first plank piece 10 matches the second plank piece 20, positions of the first plank piece 10 and the second plank piece 20 are corrected by the first rising portion 12 and the second rising portion 22, and it is possible to make both the plank pieces come into contact with each other according to a design. After the first plank piece 10 and the second plank piece 20 come into contact with each other, welding, hemming, or caulking may be performed on outer circumferential rims, and the like of the first plank piece 10 and the second plank piece 20 as necessary. Through the above processes, the shape of the bending portion 30 is completed, and the press-molded product 100 is completed.

Next, effect of the present embodiment will be described. There is a scheme of bending a blank at a predetermined part such that plank pieces come into contact with each other as so-called Monaka to join the plank pieces to each other when a molded article having a hollow shape is formed by pressing. However, in some cases, there is difficulty in smoothly joining the plank pieces to which other due to variation in shape of the plank pieces. When a shape such as a flange corresponding to the part that matches the plank pieces with each other is largely formed to cope with the above-described case, there is a problem in that a weight of a product increases.

On the other hand, in the present embodiment, the rims of the punching portions 11 and 21 formed in the first plank piece 10 and the second plank piece 20 are raised to form the first rising portion 12 and the second rising portion 22, and the first plank piece 10 and the second plank piece 20 are positioned by engaging the first rising portion 12 with the second rising portion 22. For this reason, the punching portions 11 and 21 are inevitably provided in a shape that positions the first plank piece 10 and the second plank piece 20, and thus it is possible to prevent increase in weight while appropriately positioning the first plank piece 10 and the second plank piece 20.

In addition, when a guide shape such as a tapered shape which guides the inserted second rising portion 22 is provided in the first rising portion 12 of the first plank piece 10, it is possible to rapidly position the first rising portion 12 and the second rising portion 22, thereby improving productivity.

In addition, when the bending portion 30 of the blanks B is formed in a hollow shape, the bending portion 30 may be used as a collar which is welded to a suspension link, and the like. In a conventional scheme, when a collar is welded to a blank, the collar is welded to a distal end of the blank, and a welded portion has a size only corresponding to a thickness of the blank. Thus, even when the collar is welded, a contact area is small, and a joint strength is not sufficiently obtained in some cases. On the other hand, when the bending portion 30 is used as the collar, the bending portion 30 comes into contact with another component to receive tension. Thus, it is possible to obtain a larger contact area when compared to a case in which the collar is welded to the distal end of the blank. For this reason, a tensile strength of a mounting portion may be increased when compared to a case in which a separate collar is welded to the distal end of the blank.

In addition, the positioning portion 40 is configured to overlap at least a portion of the range R formed by extending the bent region A, which is formed by the bending portion 30, along a bending direction d1 of the blanks B when the press-molded product 100 is seen in plan view. For this reason, even when the positions of the first rising portion 12 and the second rising portion 22 vary, it is possible to prevent deformation such as distortion of the hollow shape which functions as the collar formed by the bending portion 30. As a result, another component may be favorably mounted on the bending portion 30.

In addition, referring to the positioning portion 40, the second rising portion 22 may be formed in a size to have play with respect to the first rising portion 12, and the second rising portion 22 may be connected to the first rising portion by coming into contact with a portion of an inner surface of the first rising portion to position the first plank piece 10 and the second plank piece 20. According to this configuration, even when the positions of the first rising portion 12 and the second rising portion 22 vary, the second rising portion 22 is connected to the first rising portion 12 by coming into contact with the first rising portion 12 at an appropriate position on an inside of the first rising portion 12. In this way, the first plank piece 10 and the second plank piece 20 may be positioned, and positioning performance may be ensured even when variation occurs.

In addition, the first rising portion 12 and the second rising portion 22 are configured to be formed by a burring process, and thus the corresponding shape may be easily formed using a conventional scheme, and this configuration may contribute to reduction in cost of the press-molded product 100.

In addition, a plurality of positioning portions, each of which corresponds to the positioning portion 40 including the first rising portion 12 and the second rising portion 22, may be provided in the press-molded product 100. In this case, it is possible to further reduce a weight of a component, and to more accurately position the first plank piece 10 and the second plank piece 20.

The present invention is not limited to the above-described embodiment, and may be variously changed within the scope of claims.

FIG. 13 is a cross-sectional view illustrating a modified example of the first rising portion of the press-molded product according to the present embodiment. Description has been given of an embodiment in which the first rising portion 12 and the second rising portion 22 are raised in the same direction. However, the present invention is not limited thereto. As illustrated in FIG. 13, a positioning portion may be configured by engaging a first rising portion 12c with a second rising portion 22c in a state in which the first rising portion 12c faces the second rising portion 22c. In addition, when the first rising portion 12c is engaged with the second rising portion 22c in the state in which the first rising portion 12c faces the second rising portion 22c, one of the rising portions may be formed in a tapered shape or a stepped shape similarly to the above embodiment.

REFERENCE SIGNS LIST

10: First plank piece
100: Press-molded product
11: First punching portion
12, 12a, 12b: First rising portion
20: Second plank piece
21: Second punching portion
22, 22a, 22b: Second rising portion
23, 24: Mounting hole
201, 202: Press die
203: Punch
204, 212: Fixed die
204a, 204b, 212a, 213a, 213b: Depression
205, 213: Movable die
211: Core
30: Bending portion
40: Positioning portion
A: Bent region
B: Blanks
d1: Bending direction
d2 to d4: Direction of movement of movable die
R: Range formed by extending bent region

The invention claimed is:

1. A press-molded product comprising:
a blank comprising a first plank piece and a second plank piece;
a bending portion connecting the first plank piece and the second plank piece; the bending portion being formed by press molding the blank; and
a first rising portion provided at the first plank piece and a second rising portion provided at the second plank piece and engaging the first rising portion and second rising portion with each other,
wherein the bending portion is formed in a hollow shape;
wherein external shapes of the first rising portion and the second rising portion are circular shapes in plan view, each of the first rising portion and the second rising portion being positioned in the respective first plank piece and in the second plank piece, and each rising portion being formed away from the bent portion, but at least a part of the first rising portion and at least a part of the second rising portion is included in an area formed by extending the bent portion to the first plank piece or to the second plank piece along the edge portion of the bent portion when the press molded product is viewed in plan view, and portions of the first plank piece and portions of the second plank piece extend beyond the area formed by extending the bent portion to the first or to the second plank piece.

2. The press-molded product according to claim 1, wherein the first rising portion and the second rising portions include a portion that are in contact with each other and a portion that are separated by play.

3. The press-molded product according to claim 1, wherein a plurality of portions engaging the first rising portion with the second rising portion are provided.

4. A method of manufacturing the press-molded product according to claim 1, wherein the press-molded product is formed by bending a blank to divide the blank into the first plank piece and the second plank piece with the bending portion interposed therebetween, and making the first plank piece and the second plank piece come into contact with each other through bending, the method comprising, stamping parts corresponding to the first plank piece and the second plank piece to form punching portions by performing punching when the blank is bent;

forming the first rising portion in the part corresponding to the first plank piece and the second rising portion in the part corresponding to the second plank piece by performing pressing to raise rims of the punching portions; and bending the blank such that the first plank piece and the second plank piece formed by the bending come into contact with each other, wherein, in the bending, a positioning portion that positions the first plank piece and the second plank piece by engaging the first rising portion with the second rising portion is formed.

5. The method of manufacturing the press-molded product according to claim 4, wherein the first rising portion and the second rising portion are formed by performing a burring process.

* * * * *